(12) United States Patent
Wang et al.

(10) Patent No.: US 11,574,632 B2
(45) Date of Patent: Feb. 7, 2023

(54) IN-CLOUD WAKE-UP METHOD AND SYSTEM, TERMINAL AND COMPUTER-READABLE STORAGE MEDIUM

(71) Applicant: Baidu Online Network Technology (Beijing) Co., Ltd, Beijing (CN)

(72) Inventors: Zhijian Wang, Beijing (CN); Sheng Qian, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 20 days.

(21) Appl. No.: 16/214,508

(22) Filed: Dec. 10, 2018

(65) Prior Publication Data

US 2019/0325871 A1 Oct. 24, 2019

(30) Foreign Application Priority Data

Apr. 23, 2018 (CN) .......................... 201810367637.2

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 15/30* (2013.01); *H04L 67/10* (2013.01); *G10L 2015/088* (2013.01)

(58) Field of Classification Search
CPC .. G06F 40/289; G10L 2015/088; G10L 17/00
See application file for complete search history.

(56) References Cited

U.S. PATENT DOCUMENTS 6,658,377 B1 * 12/2003 Anward ................ G06F 40/268
704/9
8,041,012 B2 10/2011 Reece et al.
(Continued)

FOREIGN PATENT DOCUMENTS

CN 101599270 A 12/2009
CN 102682771 A 9/2012
(Continued)

OTHER PUBLICATIONS

Notice of Reasons for Refusal issued in connection with corresponding Japanese Patent Application No. 2018-232121, dated Feb. 13, 2020.
(Continued)

*Primary Examiner* — Thomas H Maung
(74) *Attorney, Agent, or Firm* — Akerman LLP

(57) ABSTRACT

An in-cloud wake-up method and system, a terminal and a non-volatile computer-readable storage medium are provided. The in-cloud wake-up method includes: receiving wake-up voice input by a user, and transmitting the wake-up voice to cloud; performing an decoding operation on the wake-up voice in cloud to generate a wake-up text; identifying wake-up characters in the wake-up text; and providing a wake-up instruction according to an identification result. With the in-cloud wake-up method, voice can be identified in cloud, and a smart device can be waken up in cloud according to the identified voice, so that resource consumption and power loss of the terminal device are reduced in the case of ensuring the quality of wake-up.

11 Claims, 4 Drawing Sheets

(51) Int. Cl.
    *G10L 15/30*     (2013.01)
    *H04L 67/10*     (2022.01)

(56)     References Cited

U.S. PATENT DOCUMENTS

| | | | |
|---|---|---|---|
| 8,154,227 | B1 | 4/2012 | Young et al. |
| 8,886,545 | B2 | 11/2014 | Meisel et al. |
| 8,938,384 | B2 | 1/2015 | Goswami |
| 9,373,321 | B2 | 6/2016 | Bapat et al. |
| 9,548,053 | B1 | 1/2017 | Basye et al. |
| 9,697,828 | B1 | 7/2017 | Prasad et al. |
| 9,734,822 | B1 | 8/2017 | Sundaram et al. |
| 9,899,021 | B1 | 2/2018 | Vitaladevuni et al. |
| 10,057,125 | B1 | 8/2018 | Roman et al. |
| 10,163,438 | B2 | 12/2018 | Clark et al. |
| 10,304,465 | B2 | 5/2019 | Gunn et al. |
| 10,365,887 | B1 * | 7/2019 | Mulherkar ............. G06F 3/167 |
| 10,580,405 | B1 * | 3/2020 | Wang ..................... G06F 3/167 |
| 2003/0004721 | A1 | 1/2003 | Zhou |
| 2006/0077174 | A1 | 4/2006 | Chung et al. |
| 2008/0147652 | A1 | 6/2008 | Kirkpatrick |
| 2010/0169291 | A1 | 7/2010 | Boyle et al. |
| 2011/0054899 | A1 | 3/2011 | Phillips et al. |
| 2012/0059652 | A1 | 3/2012 | Adams et al. |
| 2013/0072080 | A1 | 3/2013 | Garbos et al. |
| 2014/0006825 | A1 | 1/2014 | Shenhav |
| 2014/0074483 | A1 | 3/2014 | van Os |
| 2014/0195247 | A1 | 7/2014 | Parkinson et al. |
| 2014/0201639 | A1 | 7/2014 | Savolainen et al. |
| 2014/0297288 | A1 | 10/2014 | Yu et al. |
| 2014/0372115 | A1 | 12/2014 | LeBeau et al. |
| 2015/0039316 | A1 | 2/2015 | Tzirkel-Hancock et al. |
| 2015/0081279 | A1 | 3/2015 | Suleman et al. |
| 2015/0142438 | A1 * | 5/2015 | Dai ........................ G10L 17/02 704/246 |
| 2015/0154953 | A1 | 6/2015 | Bapat et al. |
| 2015/0287413 | A1 | 10/2015 | Jung et al. |
| 2015/0302847 | A1 | 10/2015 | Yun et al. |
| 2016/0055847 | A1 | 2/2016 | Dahan |
| 2016/0093304 | A1 | 3/2016 | Kim et al. |
| 2016/0098991 | A1 | 4/2016 | Luo et al. |
| 2016/0140962 | A1 | 5/2016 | Sharifi |
| 2016/0155443 | A1 | 6/2016 | Khan et al. |
| 2016/0180844 | A1 | 6/2016 | VanBlon et al. |
| 2016/0267913 | A1 | 9/2016 | Kim et al. |
| 2017/0154629 | A1 | 6/2017 | Lu et al. |
| 2017/0162198 | A1 | 6/2017 | Chakladar et al. |
| 2017/0169817 | A1 | 6/2017 | VanBlon et al. |
| 2018/0074785 | A1 | 3/2018 | Ohmura |
| 2018/0108343 | A1 | 4/2018 | Stevans et al. |
| 2018/0190281 | A1 | 7/2018 | Tang |
| 2018/0233150 | A1 * | 8/2018 | Gruenstein ............. G10L 15/30 |
| 2018/0336894 | A1 | 11/2018 | Graham et al. |
| 2019/0027130 | A1 | 1/2019 | Tsunoo et al. |
| 2019/0043510 | A1 | 2/2019 | Wang et al. |
| 2019/0139545 | A1 | 5/2019 | Yuan |
| 2019/0189019 | A1 | 6/2019 | Hammersley et al. |

FOREIGN PATENT DOCUMENTS

| | | |
|---|---|---|
| CN | 103095911 A | 5/2013 |
| CN | 103456306 A | 12/2013 |
| CN | 103714815 A | 4/2014 |
| CN | 103956168 A | 7/2014 |
| CN | 104183237 A | 12/2014 |
| CN | 104769668 A | 7/2015 |
| CN | 204440902 U | 7/2015 |
| CN | 104978965 A | 10/2015 |
| CN | 105895103 A | 8/2016 |
| CN | 105931644 A | 9/2016 |
| CN | 105976813 A | 9/2016 |
| CN | 106157950 A | 11/2016 |
| CN | 106448664 A | 2/2017 |
| CN | 106611597 A | 5/2017 |
| CN | 106653031 A | 5/2017 |
| CN | 107134279 A | 9/2017 |
| CN | 107230475 A | 10/2017 |
| CN | 107358954 A | 11/2017 |
| CN | 107564517 A | 1/2018 |
| CN | 107610702 A | 1/2018 |
| CN | 107622770 A | 1/2018 |
| CN | 107704275 A | 2/2018 |
| EP | 2784774 A1 | 10/2014 |
| JP | 2000-89789 A | 3/2000 |
| JP | 2004032087 A | 1/2004 |
| JP | 2004-96520 A | 3/2004 |
| JP | 2016532146 A | 10/2016 |
| JP | WO2014171144 A1 | 2/2017 |
| WO | 2014020588 A1 | 2/2014 |

OTHER PUBLICATIONS

Chinese Search Report issued in connection with corresponding Chinese Application No. 2018103676372, dated Jan. 8, 2020.
Zhang, Wei "The Design of a Voice Control Embedded System for Smart House," Information Engineering College of Zhengzhou University, May 2015.
Notification to Grant Patent Right for Invention issued in connection with corresponding Chinese Application No. 2018103676372, dated Feb. 3, 2020.
First Office Action issued in connection with corresponding Chinese Application No. 201810367637.2, dated May 7, 2019.
Chinese Search Report issued in connection with corresponding Chinese Application No. 201810367637.2, dated Apr. 25, 2019.
Decision to Grant a Patent dated May 28, 2020, issued in connection with Japanese Patent Application No. 2018-047997.
Search Report dated Feb. 24, 2020, issued in connection with Chinese Patent Application No. 2017105435728.
Search Report issued in connection with Chinese Patent Application No. 2017105254224.
Supplementary Search Report issued in connection with Chinese Patent Application No. 2017105254224.

* cited by examiner

IN-CLOUD WAKE-UP METHOD AND SYSTEM, TERMINAL AND COMPUTER-READABLE STORAGE MEDIUM

The present application claims the benefit of priority to Chinese patent application No. 201810367637.2, filed before the State Intellectual Property Office on Apr. 23, 2018, and entitled "In-cloud Wake-up Method And System, Terminal And Computer-Readable Storage Medium", which is incorporated in the present application by reference in its entirety.

TECHNICAL FIELD

The present disclosure relates to the field of communication technology, and in particular, to an in-cloud wake-up method and system, a terminal and a non-volatile computer-readable storage medium.

BACKGROUND

With the development of science and technology, smart devices such as home appliances can be manipulated by user's voice. That is, it is necessary to wake up smart devices by voice.

Currently, local wake-up is applied in existing wake-up solutions. For the local wake-up, in fact, there are great requirements on both power consumption and resource occupation of terminal devices. Moreover, it is needed to compress the wake-up model, since the memory space of the terminal device is limited. However, once the wake-up model is compressed, it may cause an impact on the wake-up effect, and may generate wake-up mistake, thereby degrading the wake-up quality.

Therefore, it is an issue of great concern how to reduce resource consumption and power loss of the wake-up model without reducing the quality of wake-up.

SUMMARY

An in-cloud wake-up method and system, a terminal and a non-volatile computer-readable storage medium are provided according to embodiments of the present disclosure, to solve one or more of the above technical problems in the prior art or at least providing an advantageous option.

In a first aspect, there is provided an in-cloud wake-up method in accordance with an embodiment of the present disclosure, the method includes:

receiving wake-up voice input by a user, and transmitting the wake-up voice to cloud;

performing an in-cloud decoding operation on the wake-up voice to generate a wake-up text;

identifying wake-up characters in the wake-up text; and providing a wake-up instruction according to an identification result.

With reference to the first aspect, in a first implementation of the first aspect of the present disclosure, the method further includes:

presetting the wake-up characters by the user; and
transmitting the wake-up characters to the cloud.

With reference to the first aspect and the first implementation thereof, in a second implementation of the first aspect of the present disclosure, the transmitting the wake-up characters to the cloud includes:

transmitting the preset wake-up characters to the cloud while transmitting the wake-up voice to the cloud.

With reference to the first aspect, the first and the second implementation thereof, in a third implementation of the first aspect of the present disclosure, the performing an in-cloud decoding operation on the wake-up voice to generate a wake-up text includes:

performing an in-cloud decoding operation on the wake-up voice by means of an acoustic model, a language model and a pronunciation dictionary, to generate the wake-up text.

With reference to the first aspect, the first, the second and the third implementation thereof, in a fourth implementation of the first aspect of the present disclosure, the identifying wake-up characters in the wake-up text includes:

identifying, in the wake-up text, matching characters which match with the wake-up characters; and adjusting and combining the matching characters to generate a wake-up word.

With reference to the first aspect and any one of the implementations described above, in a fifth implementation of the first aspect of the present disclosure, the providing a wake-up instruction according to an identification result includes:

providing the wake-up instruction according to the wake-up word.

In a second aspect, there is provided an in-cloud wake-up system in accordance with an embodiment of the present disclosure, the system includes:

a voice receiving unit configured to receive wake-up voice input by a user, and to transmit the wake-up voice to cloud;

a voice decoding unit configured to perform an in-cloud decoding operation on the wake-up voice to generate a wake-up text;

a voice identification unit configured to identify wake-up characters in the wake-up text; and a wake-up instruction unit configured to provide a wake-up instruction according to an identification result.

With reference to the second aspect, in a first implementation of the second aspect of the present disclosure, the system further includes:

a wake-up character setting unit configured to preset the wake-up characters by the user; and a wake-up character transmission unit configured to transmit the wake-up characters to the cloud.

With reference to the second aspect and the first implementation thereof, in a second implementation of the second aspect of the present disclosure, the wake-up character transmission unit is further configured to transmit the preset wake-up characters to the cloud while transmitting the wake-up voice to the cloud.

With reference to the second aspect, the first and the second implementation thereof, in a third implementation of the second aspect of the present disclosure, the voice decoding unit is configured to perform an in-cloud decoding operation on the wake-up voice by means of an acoustic model, a language model and a pronunciation dictionary, to generate the wake-up text.

With reference to the second aspect, the first, the second and the third implementation thereof, in a fourth implementation of the second aspect of the present disclosure, the voice identification unit includes:

a character matching unit configured to identify, in the wake-up text, matching characters which match with the wake-up characters; and a wake-up generation unit configured to adjust and combine the matching characters to generate a wake-up word.

With reference to the second aspect and any one of the implementations described above, in a fifth implementation of the second aspect of the present disclosure, the wake-up instruction unit is further configured to provide the wake-up instruction according to the wake-up word.

In a third aspect, there is provided an in-cloud wake-up terminal in accordance with an embodiment of the present disclosure, the terminal includes:

one or more processors; and a memory configured to store one or more programs; wherein the one or more programs enable the one or more processors to implement any one of the in-cloud wake-up methods described above when executed by them.

In a fourth aspect, there is provided a non-volatile computer-readable storage medium according to an embodiment of the present disclosure, in which computer programs are stored, wherein a process executes the computer programs to implement any one of the in-cloud wake-up methods in the first aspect described above.

The functions may be implemented by hardware, or may also be implemented by means of corresponding software executed by hardware. The hardware or software includes one or more modules corresponding to the above-described functions.

One of the above-described technical solutions has the following advantages or beneficial effects. With the in-cloud wake-up method of the present disclosure, voice can be identified in cloud, and a smart device can be waken up according to the voice identified in cloud, so that resource consumption and the power loss of the terminal device are reduced in the case of ensuring the wake-up quality.

The above summary is provided only for illustration, and is not intended to limit the disclosure in any way. In addition to the illustrative aspects, implementations and characteristics described above, further aspects, implementations and characteristics of the present disclosure may be readily understood with reference to the accompanying drawings and the following detailed description.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENTS

Hereinafter, only some exemplary embodiments are simply described. As can be recognized by those skilled in the art, the described embodiments can be modified in various different ways without departing from the spirit or scope of the present disclosure. Accordingly, the accompanying drawings and the description should be essentially considered as illustrative rather than limitative.

An in-cloud wake-up method, system and a terminal of the present disclosure will be described below in combination with FIG. 1 to FIG. 7.

Figure 1:
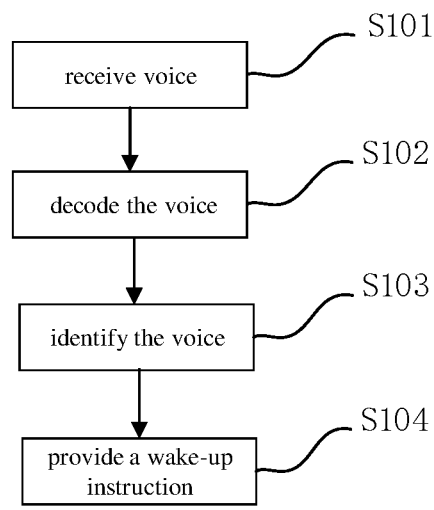
FIG. 1 is a flowchart of an in-cloud wake-up method 100 according to an embodiment of the present disclosure.

With reference to FIG. 1, the in-cloud wake-up method 100 of the present disclosure includes the following steps S101 to S104.

Firstly, in step S101 of receiving voice, wake-up voice input by a user is received.

The wake-up voice may be received through a built-in microphone of the terminal device. Alternatively, a microphone array connected with the terminal device may be provided. In the beam-forming technology, an angle of the beam forming is set according to the source of the sound. Thus, far-field voice of users from different directions can be received with directivity.

The wake-up voice is based on the current wake-up demand of a user. For example, if a user wants to open a refrigerator, he/she may input wake-up voice "open the refrigerator". Certainly, the wake-up voice of the user may not be accurate, or may also be a piece of voice which expresses a wake-up demand, for example, "it is so hot, please turn on the air conditioner for a while".

After the wake-up voice of the user is received, the wake-up voice is transmitted to the cloud.

Then, at the voice decoding step S102, an in-cloud decoding operation is performed on the transmitted wake-up voice.

In an embodiment, the decoding operation may be implemented by means of an acoustic model, a language model, a pronunciation dictionary or a combination thereof, which are not limited herein. After the wake-up voice is decoded, the voice signal can be converted into a character signal, thus a wake-up text is generated.

The acoustic model, the language model and the pronunciation dictionary used in the decoding operation are all created in cloud. Since the cloud space is large, there is no need to compress the acoustic model, the language model or the pronunciation dictionary, the decoding quality is therefore guaranteed.

After the wake-up text is generated, at the voice identification step S103, wake-up characters in the wake-up text are identified. Thus, it is determined whether and which wake-up characters are contained in the wake-up text.

The wake-up characters may be set in cloud in advance, or may also be transmitted to cloud in advance. The specific way of operation will be described hereinafter.

In an embodiment, the wake-up characters may include names and/or nicknames of smart devices, and verbs related to turning on, turning off, pausing, sleeping and the like, which are not limited herein. The related wake-up characters may be set according to individual needs of users.

Taking the waken-up text being "turn on the air conditioner" as an example, at the voice identification step S103, it may be identified which wake-up characters are contained in "turn on the air conditioner", such as the name "air conditioner" of the smart device, and the verb "turn on" related to turning on. Then, the "air conditioner" and "turn on" may be sent to a wake-up instruction step S104.

At the end, at the wake-up instruction step S104, a wake-up instruction may be provided according to an identification result, i.e., "air conditioner" and "turn on". In this case, a wake-up instruction of using the air conditioner is provided according to the identification result, i.e., "air conditioner" and "turn on", and the air conditioner is turned on.

The voice identification step S103 and the wake-up instruction step S104 may also be completed in cloud so that no local resource is occupied, thus reducing the resource consumption as well as the power loss of the local terminal device.

With the in-cloud wake-up method 100 of the present disclosure, voice can be decoded and identified in cloud, and a smart device can be waken up according to the voice identified in cloud, thus reducing the resource consumption and the power loss of the terminal device.

Figure 2:
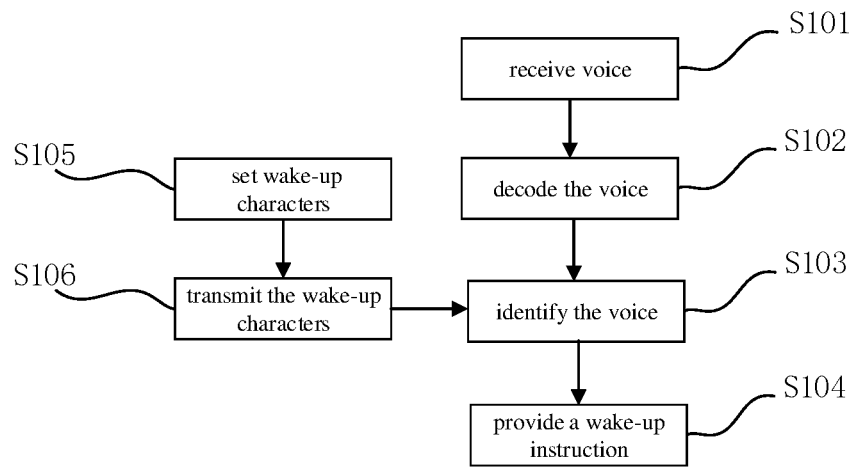
FIG. 2 is a flowchart of an in-cloud wake-up method 200 according to another embodiment of the present disclosure.

With reference to FIG. 2, an in-cloud wake-up method 200 is provided according to another embodiment of the present disclosure. On the basis of the method 100, the method 200 further includes a wake-up character setting step S105 and a wake-up character transmission step S106.

At the wake-up character setting step S105, wake-up characters may be preset by a user as required.

The wake-up characters may simply include the names of smart devices, such as refrigerator, television, air conditioner and so on, and may also include nicknames set for smart devices according to the preferences of users, such as piggy refrigerator, little cold air conditioner and the like. Further, the wake-up characters may include verbs related to operations as well, such as turn on, turn off, pause, sleep or the like.

Further, at the wake-up character setting step S105, a user may also retrieve factory names of smart devices, i.e., default names set by a manufacturer, and may also use these factory names as wake-up characters directly.

After the wake-up characters are set, the method proceeds to a wake-up character transmission step S106 to transmit the wake-up characters to the cloud.

In an embodiment, the user may set the wake-up characters locally, and transmit the set wake-up characters to the cloud for saving so that they can be used for subsequent voice identification.

Preferably, at the wake-up character transmission step S106, the preset wake-up characters are transmitted to the cloud while the wake-up voice is transmitted to the cloud. In this way, it is convenient to identify the wake-up text immediately after decoding the wake-up voice in the cloud, and to instruct to wake-up according to the identification result, since the wake-up characters are transmitted together with the wake-up voice.

With the in-cloud wake-up method 200 of the present disclosure, the wake-up characters are transmitted to the cloud. Since the cloud space is large and may be used to store massive data groups, there is no need to compress the wake-up characters. Therefore, the coverage of the wake-up characters may be ensured, thus improving the identification of the wake-up characters and the wake-up text as well as the match between the both, increasing the wake-up effect, and also reducing the occurrence of false positives in the wake-up.

Figure 3:
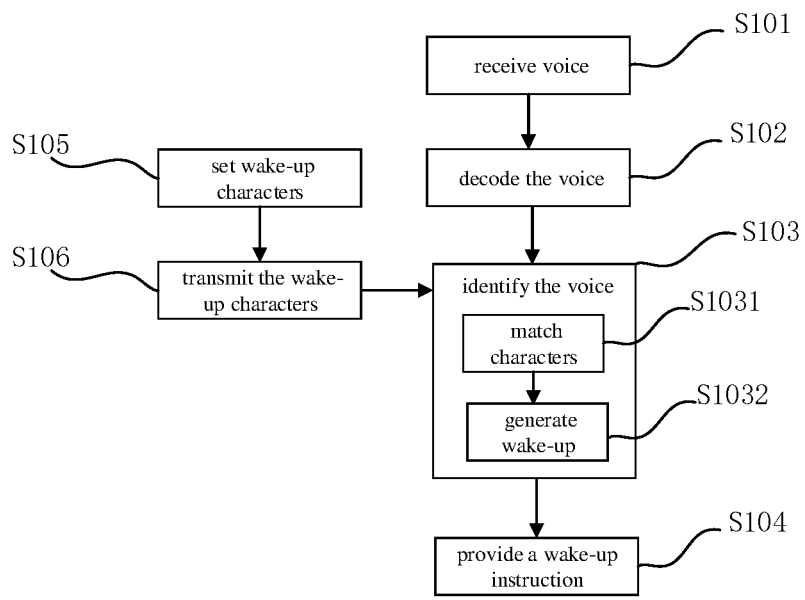
FIG. 3 is a flowchart of an in-cloud wake-up method 300 according to a further embodiment of the present disclosure.

With reference to FIG. 3, an in-cloud wake-up method 300 is provided according to a further embodiment of the present disclosure. On the basis of the method 200, the voice identification step S103 may include a character matching step S1031 and a wake-up generation step S1032.

In an embodiment, with reference to FIG. 3, at the character matching step S1031, matching characters which match with the wake-up characters may be identified, in the wake-up text.

Taking the wake-up text being "it is so hot, please turn on the air conditioner for a while" as an example, in this case, the semantics of the wake-up text is vague. When the preset wake-up characters include "television", "air conditioner", "turn on" and "open", at the character matching step S1031, it can be identified that the characters in the "it is so hot, please turn on the air conditioner for a while" which match with the preset wake-up characters ("television", "air conditioner", "turn on" and "open"), i.e., the matching characters, are "air conditioner" and "turn on".

Then, at the wake-up generation step S1032, the identified matching characters may be adjusted and combined to generate a wake-up word. For example, the matching characters "air conditioner" and "turn on" are adjusted and combined in terms of positional and logical relations to generate the wake-up words "turn on the air conditioner".

In an embodiment, at the wake-up instruction step S104, a wake-up instruction is provided according to the wake-up word. For example, a wake-up instruction of turning on the air conditioner is provided according to the wake-up words "turn on the air conditioner", thereby waking up the air conditioner.

With the in-cloud wake-up method 300 of the present disclosure, in a case that the semantics of the wake-up text is vague, after the matching characters are identified, the matching characters may be adjusted and combined to generate a wake-up word. In the method 300, the wake-up word may be generated through adjustment and combination, and there is no need to change the construction model of the wake-up characters, thereby saving technical resource and also reducing the occurrence of false positives.

Figure 4:
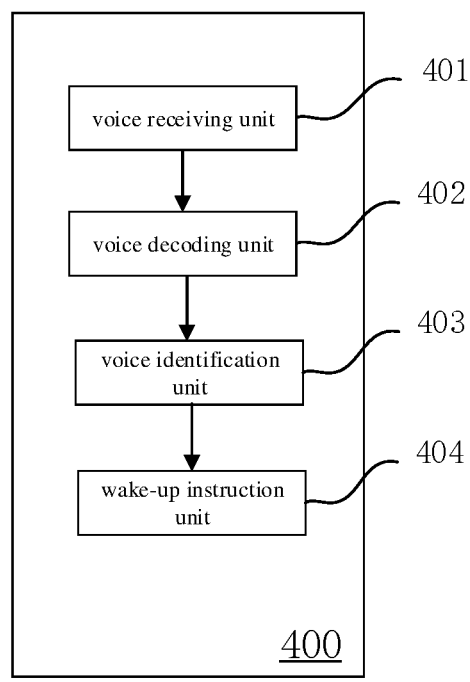
FIG. 4 is a structural block diagram of an in-cloud wake-up system 400 according to an embodiment of the present disclosure.

With reference to FIG. 4, an in-cloud wake-up system 400 is provided, including: a voice receiving unit 401, a voice decoding unit 402, a voice identification unit 403 and a wake-up instruction unit 404.

The voice receiving unit 401 is configured to receive wake-up voice input by a user, and to transmit the wake-up voice to cloud.

The wake-up voice may be received through a built-in microphone of the terminal device. Alternatively, a microphone array connected with the terminal device may be provided. In the beam-forming technology, an angle of the beam forming is set according to the source of the sound. Thus, far-field voice of users from different directions can be received with directivity.

The wake-up voice is based on the current wake-up demand of a user. For example, if a user wants to open the refrigerator, he/she may input wake-up voice "open the refrigerator". Certainly, the wake-up voice of a user may not be accurate, or may also be a piece of voice which expresses a wake-up demand, for example, "it is so hot, please turn on the air conditioner for a while".

The voice decoding unit 402 is configured to perform an in-cloud decoding operation on the wake-up voice to generate a wake-up text.

In an embodiment, the decoding operation may be implemented by means of an acoustic model, a language model, a pronunciation dictionary, or a combination thereof, which are not limited herein. After the wake-up voice is decoded, the voice signal can be converted into a character signal, and thus a wake-up text is generated.

The acoustic model, the language model and the pronunciation dictionary used in the decoding operation are all created in the cloud. Since the cloud space is large, there is no need to compress the acoustic model, the language model or the pronunciation dictionary, the decoding quality is therefore guaranteed.

The voice identification unit 403 is configured to identify wake-up characters in the wake-up text.

In an embodiment, by identifying the wake-up text, it is determined whether and which wake-up characters are contained in the wake-up text.

The wake-up characters may be set in cloud in advance, or may also be transmitted to cloud in advance. The specific operation unit will be described hereinafter.

The wake-up instruction unit 404 is configured to provide a wake-up instruction according to an identification result.

The voice identification unit 403 and the wake-up instruction unit 404 may also be provided in cloud, so that no local resource is occupied, thus reducing the resource consumption as well as the power loss of the local terminal device.

With the in-cloud wake-up system 400 of the present disclosure, voice can be decoded and identified in cloud, and a smart device can be waken-up in cloud according to the identified voice, thus reducing the resource consumption and the power loss of the terminal device.

Specifically, the in-cloud wake-up system 400 shown in FIG. 4 corresponds to the in-cloud wake-up method 100 shown in FIG. 1. For the specific implementation of the system shown in FIG. 4, please refer to the description given in the embodiment of the method shown in FIG. 1.

Figure 5:
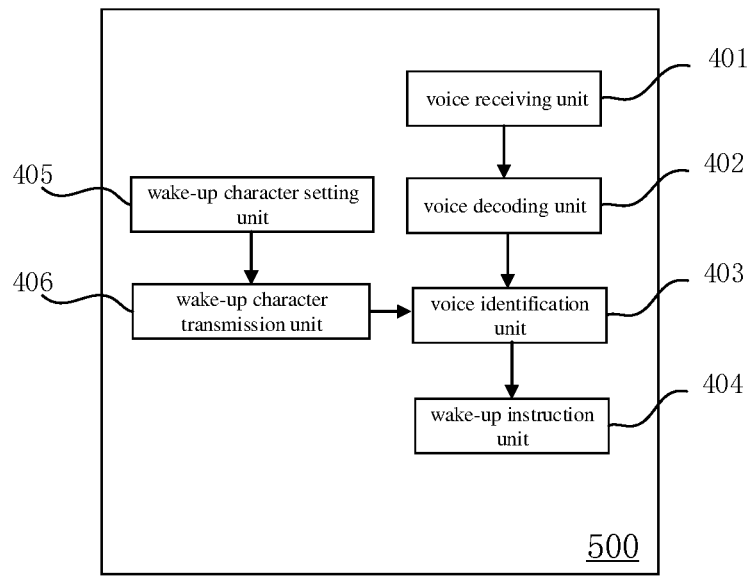
FIG. 5 is a structural block diagram of an in-cloud wake-up system 500 according to another embodiment of the present disclosure.

With reference to FIG. 5, an in-cloud wake-up system 500 is provided according to another embodiment of the disclosure. On the basis of the system 400, the system 500 further includes a wake-up character setting unit 405 and a wake-up character transmission unit 406.

The wake-up character setting unit 405 is configured to preset the wake-up characters by the user.

The wake-up character transmission unit 406 is configured to transmit the wake-up characters to the cloud.

In an embodiment, the user may set the wake-up characters locally and transmit the set wake-up characters to the cloud for saving so that they can be used for subsequent voice identification.

Preferably, the wake-up character transmission unit 406 can transmit the preset wake-up characters to the cloud while transmitting the wake-up voice to the cloud. In this way, it is convenient to identify the wake-up text immediately after decoding the wake-up voice in the cloud, and instruct to wake-up according to the identification result, since the wake-up characters are transmitted together with the wake-up voice.

Specifically, the in-cloud wake-up system 500 shown in FIG. 5 corresponds to the in-cloud wake-up method 200 shown in FIG. 2. For the specific implementation of the system shown in FIG. 5, please refer to the description given in the embodiment of the method shown in FIG. 2.

Figure 6:
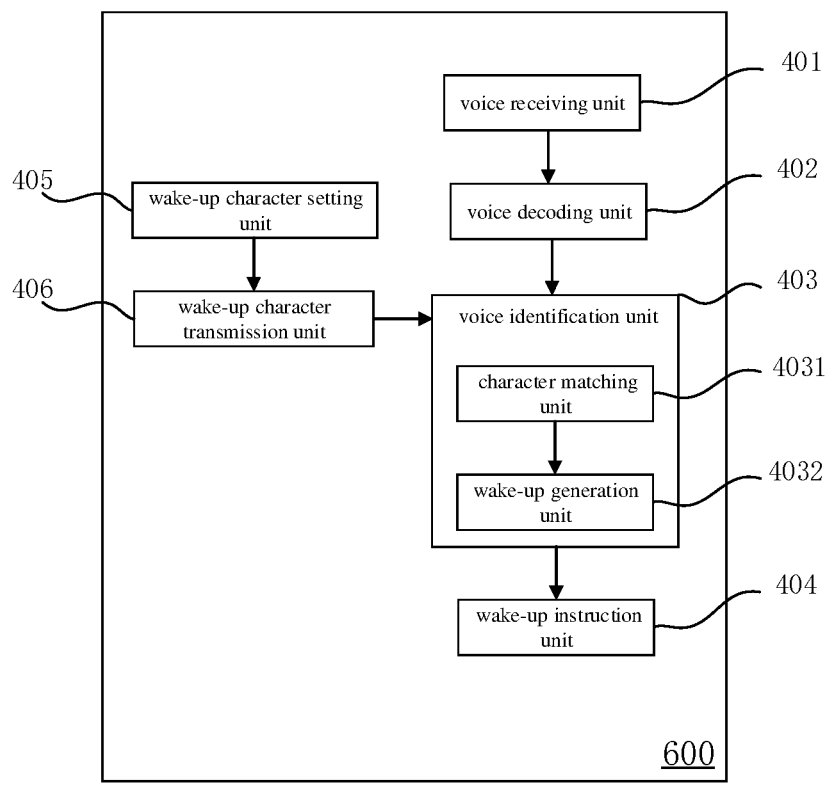
FIG. 6 is a structural block diagram of an in-cloud wake-up system 600 according to a further embodiment of the present disclosure.

With reference to FIG. 6, an in-cloud wake-up system 600 is provided according to a further embodiment of the present disclosure. On the basis of the system 500, the voice identification unit 403 may include a character matching unit 4031 and a wake-up generation unit 4032.

The character matching unit 4031 is configured to identify, in the wake-up text, matching characters which match with the wake-up characters.

The wake-up generation unit 4032 is configured to adjust and combine the matching characters to generate a wake-up word.

In an embodiment, the wake-up instruction unit 404 may be configured to provide the wake-up instruction according to the wake-up word.

Specifically, the in-cloud wake-up system 600 shown in FIG. 6 corresponds to the in-cloud wake-up method 300 shown in FIG. 3. For the specific implementation of the system shown in FIG. 6, please refer to the description given in the embodiment of the method shown in FIG. 3.

Figure 7:
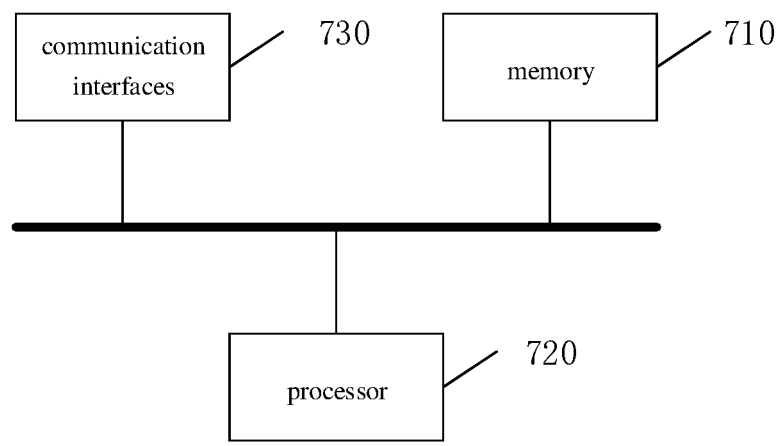
FIG. 7 is a schematic diagram of an in-cloud wake-up terminal according to the present disclosure.

With reference to FIG. 7, an in-cloud wake-up control terminal includes a memory 710 and a processor 720. Computer programs that can run on the processor 720 are stored in the memory 710. When the processor 720 executes the computer programs, the in-cloud wake-up methods in the above embodiments are implemented. The quantity of the memory 710 and the processor 720 may be one or more, respectively.

The processor further includes:

communication interfaces 730 configured to communicate with an external device to realize data interaction and transmission.

The memory 710 may include a high-speed RAM memory, or may also include a non-volatile memory, for example, at least one magnetic disk memory.

If the memory 710, the processor 720 and the communication interfaces 730 are implemented independently, the memory 710, the processor 720 and the communication interfaces 730 may be connected and communicate with each other via a bus. The bus may be an Industry Standard Architecture (ISA) bus, a Peripheral Component Interconnect (PCI) bus, an Extended Industry Standard Architecture (EISA) bus, or the like. The bus may be categorized into an address bus, a data bus, a control bus or the like. For ease of illustration, only one bold line is shown in FIG. 7 to represent the bus, but it does not mean there is only one bus or only one type of bus.

Optionally, in a specific implementation, if the memory 710, the processor 720 and the communication interfaces 730 are integrated into one chip, then the memory 710, the processor 720 and the communication interfaces 730 can communicate with each other via internal interfaces.

In an embodiment, the present disclosure further provides a non-volatile computer-readable storage medium having computer programs stored therein, which implement any of the in-cloud wake-up methods in the first aspect described above when executed by a processor.

In the present specification, the description referring to the terms "an embodiment", "some embodiments", "an example", "a specific example", or "some examples" or the like are intended to mean that the specific characteristics, structures, materials, or features described in connection with the embodiment or example are contained in at least one embodiment or example of the present disclosure. Moreover, the specific characteristics, structures, materials, or features described may be combined in a suitable manner in any one or more embodiments or examples. In addition, various embodiments or examples as well as features of different embodiments or examples described in the specification may be united and combined by those skilled in the art, as long as they do not contradict with each other.

Furthermore, terms "first" and "second" are used for descriptive purposes only, and are not to be construed as indicating or implying relative importance or implicitly indicating the quantity of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method description in the flowcharts or otherwise described herein may be construed as representing a module, segment or portion of codes of executable instructions, which include one of more steps for implementing a particular logical function or process. In addition, the scope of the preferred embodiments of the present disclosure includes additional implementations, in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein, for example, may be considered as an ordered list of executable instructions for implementing logical functions. They can be specifically embodied in any non-volatile computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "the non-volatile computer-readable medium" can be any means that can contain, store, communicate with, propagate or transmit programs for use by an instruction execution system, apparatus or device or for use in conjunction with these instruction execution system, apparatus or device. More specific examples (non-exhaustive list) of the non-volatile computer-readable storage medium include: electrical connection parts (electronic devices) having one or more wires, portable computer disk cartridges (magnetic devices), random access memory (RAM), read-only memory (ROM), erasable programmable read-only memory (EPROM or flash memory), fiber optic devices, and portable read only memory (CDROM). In addition, the non-volatile computer-readable storage medium may even be a paper or other suitable medium on which the programs can be printed. This is because for example the paper or other medium can be optically scanned, followed by edition, interpretation or, if necessary, other suitable ways of processing so as to obtain the programs electronically, which are then stored in computer memory.

It should be understood that individual portions of the present disclosure may be implemented in the form of hardware, software, firmware, or a combination thereof. In the above embodiments, a plurality of steps or methods may be implemented by using software or firmware stored in a memory and executed by a suitable instruction execution system. For example, if they are implemented by hardware, as in another implementation, the steps or methods may be implemented by using any one or a combination of the following techniques known in the art: discrete logic circuits having logic gate circuits configured to implement logic functions for the data signals, application-specific integrated circuits having appropriate combined logic gate circuits, programmable gate arrays (PGAs), field programmable gate arrays (FPGAs), etc.

Those skilled in the art may understand that all or part of the steps carried in the method of the foregoing embodiments may be implemented by using a program to instruct the relevant hardware. The program may be stored in a non-volatile computer-readable storage medium, and includes one or a combination of the steps of the method embodiments when executed.

In addition, individual functional units in various embodiments of the present disclosure may be integrated into one processing module, or individual units may also exist physically and independently, or two or more units may also be integrated in one module. The above integrated module can be implemented in the form of hardware or in the form of a software functional module. The integrated module may also be stored in a non-volatile computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto. Various changes or replacements readily contemplated by those skilled in the art within the technical scope of the present disclosure shall fall within the protection scope of the present disclosure. Therefore, the protection scope of the present disclosure should be subject to the protection scope of the claims.

What is claimed is:

1. An in-cloud wake-up method, comprising:
   receiving, by a terminal device, wake-up voice input by a user for a smart device, and transmitting the wake-up voice to cloud;
   transmitting, by the terminal device, wake-up characters preset by the user to the cloud, wherein the wake-up characters comprise a name of the smart device and information related to an operation that the user wants the smart device to perform;
   performing, in the cloud, an in-cloud decoding operation on the wake-up voice to generate a wake-up text;
   identifying, in the cloud, the wake-up characters in the wake-up text; and
   providing, in the cloud, a wake-up instruction to the smart device according to an identification result, to cause the smart device to perform the operation that the user wants the smart device to perform;
   wherein the transmitting, by the terminal device, the wake-up characters preset by the user to the cloud comprises:
   transmitting the preset wake-up characters to the cloud while transmitting the wake-up voice to the cloud; and
   wherein the identifying, in the cloud, the wake-up characters in the wake-up text comprises:
   extracting, from the wake-up text, matching characters which match with the wake-up characters, and combining the extracted matching characters into a set of wake-up words corresponding to the wake-up instruction by adjusting positional and logical relations between the extracted matching characters.

2. The method according to claim 1, wherein the performing, in the cloud, the in-cloud decoding operation on the wake-up voice to generate the wake-up text comprises:
   performing an in-cloud decoding operation on the wake-up voice by means of an acoustic model, a language model and a pronunciation dictionary, to generate the wake-up text.

3. The method according to claim 1, wherein the providing, in the cloud, the wake-up instruction to the smart device according to the identification result comprises:
   providing the wake-up instruction according to the set of wake-up words.

4. An in-cloud wake-up system, comprising:
   one or more processors; and
   a storage device configured for storing one or more programs, wherein the one or more programs are executed by the one or more processors to enable the one or more processors to:
   receive, by a terminal device, wake-up voice input by a user for a smart device, and to transmit the wake-up voice to cloud;

transmit, by the terminal device, wake-up characters preset by the user to the cloud, wherein the wake-up characters comprise a name of the smart device and information related to an operation that the user wants the smart device to perform;

perform, in the cloud, an in-cloud decoding operation on the wake-up voice to generate a wake-up text;

identify, in the cloud, the wake-up characters in the wake-up text; and provide, in the cloud, a wake-up instruction to the smart device according to an identification result, to cause the smart device to perform the operation that the user wants the smart device to perform;

wherein the one or more programs are executed by the one or more processors to enable the one or more processors to transmit the preset wake-up characters to the cloud while transmitting the wake-up voice to the cloud; and wherein the one or more programs are executed by the one or more processors to enable the one or more processors to:

extract, from the wake-up text, matching characters which match with the wake-up characters, and combine the extracted matching characters into a set of wake-up words corresponding to the wake-up instruction by adjusting positional and logical relations between the extracted matching characters.

5. The system according to claim 4, wherein the one or more programs are executed by the one or more processors to enable the one or more processors to perform an in-cloud decoding operation on the wake-up voice by means of an acoustic model, a language model and a pronunciation dictionary, to generate the wake-up text.

6. The system according to claim 4, wherein the one or more programs are executed by the one or more processors to enable the one or more processors to provide the wake-up instruction according to the set of wake-up words.

7. An in-cloud wake-up method, comprising:

receiving, by a cloud server, wake-up voice input by a user for a smart device from a terminal device;

receiving, by the cloud server, wake-up characters preset by the user from the terminal device, wherein the wake-up characters comprise a name of the smart device and information related to an operation that the user wants the smart device to perform;

performing, by the cloud server, a decoding operation on the wake-up voice in cloud to generate a wake-up text;

identifying, by the cloud server, the wake-up characters in the wake-up text; and providing, by the cloud server, a wake-up instruction to the smart device according to an identification result, to cause the smart device to perform the operation that the user wants the smart device to perform;

wherein the receiving the wake-up characters preset by the user comprises:

receiving the wake-up characters preset by the user while receiving the wake-up voice; and wherein the identifying the wake-up characters in the wake-up text comprises:

extracting, from the wake-up text, matching characters which match with the wake-up characters, and combining the extracted matching characters into a set of wake-up words corresponding to the wake-up instruction by adjusting positional and logical relations between the extracted matching characters.

8. The method according to claim 7, wherein the performing a decoding operation on the wake-up voice in cloud to generate a wake-up text comprises:

performing the decoding operation on the wake-up voice in cloud by means of an acoustic model, a language model and a pronunciation dictionary, to generate the wake-up text.

9. The method according to claim 7, wherein the providing a wake-up instruction according to an identification result comprises:

providing the wake-up instruction according to the wake-up word.

10. An in-cloud wake-up terminal, the terminal comprising:

one or more processors; and a memory, which is configured to store one or more programs; wherein the one or more programs enable the one or more processors to implement the method according to claim 1 when executed by the one or more processors.

11. A non-transitory computer-readable storage medium, in which computer programs are stored, wherein a process executes the computer programs to implement the method according to claim 1.

* * * * *